June 28, 1966 A. W. BROWN ETAL 3,258,387

DIELECTRIC PANELS

Filed April 6, 1961

INVENTORS
ALFRED WINSOR BROWN &
BY DAVID EDWARD LEARY

Stachin & Overman
ATTORNEYS

United States Patent Office 3,258,387

Patented June 28, 1966

3,258,387

DIELECTRIC PANELS

Alfred Winsor Brown, Woonsocket, and David E. Leary, Warwick, R.I., assignors to Owens-Corning Fiberglas Corporation, a corporation of Delaware Filed Apr. 6, 1961, Ser. No. 101,221
8 Claims. (Cl. 161—140)

This invention relates generally to reinforced plastic panels adapted particularly to serve as bases for printed circuits, terminal strips and other electrical boards. The invention further pertains to materials and methods for creating such products.

As the widest utilization is for printed circuits, this invention will be explained in connection with panels for this particular purpose. The sheets or boards offered commercially, prior to this invention, for carrying printed circuits have all been of a laminated nature. Predominant among these products has been a phenolic resin impregnated paper. Others have included glass cloths impregnated with melamine, silicon, epoxy, or phenylsilane resins. A copper foil on which the circuit is formed by subsequent etching is usually adhesively attached to the base panel. However, the circuit pattern may be applied as a preformed stamping, photosensitized surfacings, or by metal deposition through electroplating or other coating methods.

While these conventional panels have been generally quite satisfactory, the continued advance in electronics in both military and commercial fields has required increased strength, reliability and versatility. These new requirements have made it necessary to study means for overcoming the weaknesses or limitations of these established products.

The inherent laminar structure of the standard panels is strongly inclined to promote dielectric failure in the planar dimensions thereof. Laminated panels are also more liable to splitting or peeling of the copper circuit film, the latter failure being influenced by a difference in thermal expansion between the panel composition and the copper overlay.

The paper base panels are naturally more susceptible to moisture penetration and the continuous yarns of the glass fabric reinforcements may afford paths for moisture or stray electrical currents.

In order to provide the panels with substantial flexural strength, it is commonly necessary to make them extra thick and heavy. Good flexural property is needed for withstanding stresses of installation and assembly and in carrying the aggregation of electronic devices mounted thereon.

The oversizing for sturdiness can be very objectionable where space is at a premium, and extra weight is a handicap. At the same time the flexural strength may still not reach the level required for certain purposes, or may not be uniform across different dimensions.

Other shortcomings include the expensive, multiple stage fabrication and the resulting high price at which some of these products must be sold. Also, the special adhesive material attaching the copper foil to the base panel in present products may cause malfunction by forming gas pockets or by releasing the circuit foil when the latter is coated with hot solder.

Another difficulty experienced with the conventional panels are fibers projecting into punched openings. These cause discontinuities in subsequent conductive films laid over the openings. A still further deficiency resides in the lack of flexibility which is frequently a desirable characteristic as it facilitates compact installation.

A primary object of this invention is to overcome the cited limitations of prior products by providing at reduced cost a dielectric panel of generally superior properties.

A further important object is to provide improved materials and simplified methods for building such panels.

More specifically, an object of this invention is to provide a compact panel of homogeneous composition and of high, isotropic dielectric and mechanical properties.

Another particular object is to provide a panel which strongly resists splitting or separation of an attached printed circuit.

A further object is to provide a stiff, non-warping dielectric panel composed of a major component of mineral flakes and a minor component of a plastic resin.

Still another object of the invention is the utilization of a combination of glass and mica flakes as a reinforcement of plastic panels.

An additional purpose of the invention is to present a simplified method of forming a copper-clad, homogeneous panel of mineral flakes and a plastic resin in which the flakes are closely associated and aligned in parallel planes.

Another aim of the invention is to provide a composite material for dielectric panels in which mineral flakes are the major constituent and are oriented in parallel planes, and there is a dispersed, secondary material of fine particles interposed between the coplanar flakes.

The aforesaid and other objects and advantages of the invention are attained through the incorporation of mineral flakes, and particularly flakes of glass, as a dielectric and strengthening component in a plastic panel. The purposes of the invention are further accomplished by extruding, in sheet form, a premixed insulating composition containing mineral flakes in a manner to compact and align the flakes in parallel planes, and when desired simultaneously joining a metal foil to the extruded sheet.

Also contributing to the attainment of the objects of the invention is the utilization of low cost mica flakes in such a way that the excellent dielectric properties thereof are utilized while the physical weaknesses including that of easy cleavage are shielded.

These and other features of the invention will be described more completely hereafter in connection with the accompanying drawings, in which:

FIGURE 1 presents, perspectively, a copper-clad panel produced according to this invention;

Figure 1:
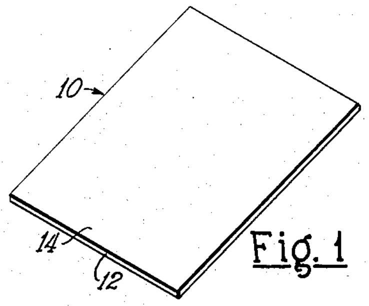
Figure 2:
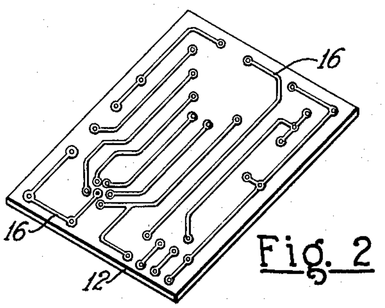
FIGURE 2 is a like view of the panel of FIGURE 1 after a circuit has been formed by etching the copper foil attached to the surface of the panel.

Referring to the drawings in more detail, the panel 10 shown in FIGURE 1 is a typical product of this invention. It has a body 12 composed of a plastic reinforced with a heavy incorporation of glass flakes and a copper foil 14 attached as a surfacing sheet on which the desired circuit pattern is conventionally created by subsequent etching. No extra adhesive is necessarily employed in attaching the copper foil as it may be secured to the plastic composite by the curing of the plastic resin of the body 12. In FIGURE 2 the panel 10 is depicted after the surfacing foil 14 has been etched to create the circuit pattern as indicated at 16.

In a preferred method of producing a panel according to the invention an epoxy resin compound is first prepared. A formulation which has proved especially satisfactory includes the following parts by weight:

300 parts of epoxy resin (Ciba Company No. 6005)

60 parts of a curing agent composed of an eutectic mixture of aliphatic and aromatic secondary amines (Ciba Company No. 957)

10 parts of a second curing agent composed of tridimethyl amino methyl phenol (Rohm & Haas DMP-30)

After the resin components are blended together, which may be accomplished by a conventional air driven propeller type mixer, the resin compound is placed in a vacuum muller or a kneader mixer with wide clearance blades. The batch is brought up to a temperature of 122° F. and glass flakes are added, preferably in an amount making them at least seventy percent by weight of the total batch. The recommended range of flakes is between fifty-five and eighty-five percent. The flakes preferably have a general thickness of two microns with quite random planar dimensions. However, care should be taken to avoid the inclusion of a substantial amount of minute flake particles.

For superior eletctrical and weathering properties a glass of commercial type "E" is utilized. This has a borosilicate composition substantially free from alkali metal oxides. The flakes are preconditioned by treatment with a coupling agent. A well known type is commercially identified as A-1100 (gamma amino propyl triethoxy silane). This gives very good results when the flakes are soaked in a bath containing a 0.06 percent aqueous solution. Additional satisfactory finishing agents include other silanes, and chromium depositing materials.

Should there be an extended interval between the drying of the flakes after their treatment with the coupling agent solution and the time of their use, they are preferably further conditioned by being held at 155° F. for twenty-four hours. This removes any excess moisture that may have gathered on the flakes in the meantime.

Figure 3:
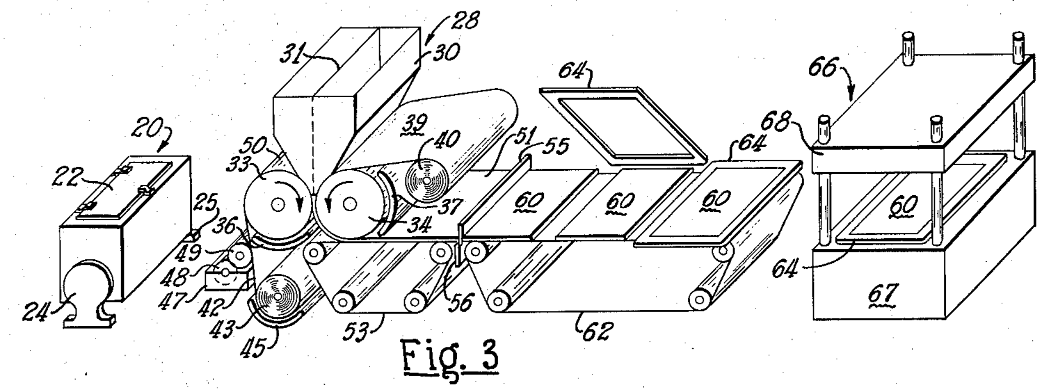
FIGURE 3 is a schematic showing of equipment in a production line adapted to fabricate panels according to this invention.

As shown diagrammatically in FIGURE 3 the kneader mixer 20 has a cover 22 and is supported on pedestals 24 and 25. It is pivotably mounted on the pedestals so that it may be tipped for filling or discharging operations. By the use of spaced mixing blades excessive fragmentation of the flake component is avoided. The mixing action is carried on for twenty minutes under a vacuum of twenty-nine inches.

After the mixing cycle, the flake glass and resin batch is brought to the extruding equipment 28. Here it is poured into the hopper 30 which may have a partition 31 to separate two different charging materials. This is removed when panels of homogeneous character are to be formed. The hopper fits down in close proximity with the contours of the extruding rollers 33 and 34. Heating elements 36 and 37 are placed adjacent rollers 33 and 34 to maintain them at a temperature of 300° F. when an epoxy resin of the type specified is used. The rollers are spaced apart a distance equal to the thickness dimension desired in the panel. A common thickness is one-eighth of an inch, but such panels may be produced in thickness ranging from one thirty-second to one-quarter of an inch.

To prevent sticking of the charging material to the rolls and to protect the surface of the formed panel blank a release paper 39 is fed from a supply roll 40 over the extruding roller 34. This paper is a parchment type; one proved satisfatcory is well known under the trademark "Patapar." Polyester and cellophane films may also be employed as parting sheets.

The copper foil 42 constituting the base for the circuit to be etched on the panel is drawn from a supply roll 43. The copper foil, preferably formed by electro-deposition, is conventionally either 0.0015 or 0.003 of an inch in thickness. It is heated to a temperature of 300° F. by the heating element 45 stationed adjacent the supply roll 43.

To thoroughly and permanently secure the copper foil 42 to the finished panel, the copper foil is desirably coated with an adhesive while heated and just prior to its passage over projection roller 33. However, it should be here noted that the invention also comprises the use of the resin component of the panel as the adhering medium where such practice is desirable.

The adhesive is held in the tank 47 from which it is picked up by the feeding roll 48, and delivered by the applicator roll 49. An adhesive that serves very satisfactorily is a phenolpolyvinyl butyral alloy resin dispersed in a solvent. Among other possible adhesives are those based upon polysulfide elastomers, modified epoxy, and polyamide resins. The adhesive is laid on the rough side of the electro-deposited copper foil in a film which may be only one-half a mil in thickness. The solvent carrier is evaporated immediately upon contact with the heated copper. The adhesive-coated copper foil 50 passes over the projection roller 33 to be positioned on the opposite side of the extruded plastic-flake glass sheeting from that covered by the release paper 39.

The hot extruding rolls 33 and 34 further fluidize the batch material. This promotes a remarkably complete orientation of the glass flake component in planes parallel with the main surfaces of the extruded composite sheet.

The extruded laminate 51 is received on the first conveyor 53 and is then cut by the opposed knife blades 55 and 56 into panel blanks 60. The latter proceed upon second conveyor 62 upon which they are assembled with an encasing frame 64 of a compressible material such as "Teflon." The units comprising the blanks 60 and the "Teflon" frames are placed between caul sheets and stacked in tier formation in the press 66. As shown diagrammatically in FIGURE 3 the press 66 has a base 67 and an upper platen 68.

A molding pressure between three and five hundred pounds per square inch is generally sufficient, but may be increased up to one thousand pounds when necessary. Curing temperatures may run between 250° F. and 350° F. to expedite the curing of epoxy resins. The molding temperatures will naturally depend upon the particular resin system employed and the speed desired.

The compressible frame or gasket 64 around each panel blank 60 confines the blank and allows it to remain under constant pressure until gelation of the resin occurs. A steady application of pressure is not otherwise obtainable with any certainty except with an enclosing mold which would be considerably more expensive and involves additional problems.

After completion of the curing step, the "Patapar" release paper 39 may be left on the finished panel 10 for protection during shipment and storage, but is necessarily removed prior to the etching of the copper to create the desired circuit pattern.

Figure 4:
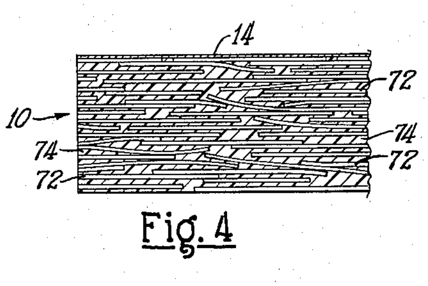
FIGURE 4 is a fragmentary vertical section through a dielectric panel produced according to this invention.

A cross-section of an edge portion of the finished panel 10 is illustrated in FIGURE 4. Between the closely packed flakes 72 are thin interposed layers of the epoxy resin 74. The copper foil 14 is firmly attached by the film of adhesive 75 which reacts or copolymerizes with the epoxy resin. The generally orderly, planar arrangement of the glass flakes is responsible for the high dielectric and flexural modulus properties of the panel.

Occasional zones where the epoxy resin is concentrated in the vicinity of non-planar or non-continuous flake formation may create points of stress weakness. The possibility of failure at such areas may be lessened by adding a very small quantity, such as one percent by weight, but not exceeding three percent, of a fine particulate material to the resin and flake glass batch.

A very suitable material is aluminum oxide platelets with a thickness less than one-half a micron. These are thoroughly dispersed throughout the resin component in the mixing operation, preferably before the introduction of the glass flakes to the mix. Their dimensions are not of a magnitude to separate the glass flakes too greatly, but rather are such to space the flakes a desired uniform distance apart.

Figure 5:
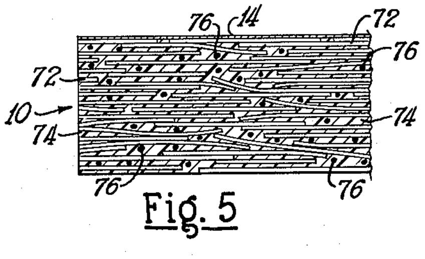
FIGURE 5 is a fragmentary vertical section through a modified form of a panel incorporating features of the invention.

Of greater import is the property of the sub-micron particles to reinforce the plastic resin where it may be more heavily concentrated, as well as in the resin films between flakes. This minor ingredient thereby adds strength to the panel. A section of a panel 10*a* containing such particles 76 is depicted in FIGURE 5.

Other discrete materials which may serve as the secondary reinforcing medium include ground silica, micromica and aluminum silicates. Care should be taken in selecting the particulate constituent to insure that the thickness dimension does not generally exceed two microns and preferably lies below one micron. For fire retarding purposes this additive may be supplemented with antimony oxide, or replaced thereby.

Mica flakes, comparable to glass flakes in their dielectric properties have an inherent structural tendency to split. This characteristic persists in the thinnest flakes into which mica may be formed by mechanical or hydraulic delaminating processes. As a consequence, cleavage under flexural or tensile stresses is a weakness of panels having a high content of planar oriented mica flakes, and is most evident adjacent interfaces such as that between a copper surfacing foil and the resinous base panel on which it is mounted.

In order that the desirable properties of mica flakes, including availability and low cost, may be utilized to advantage this invention includes the combining of glass flakes and mica flakes in particular arrangements and through specific methods.

One manner of practicing this aspect of the invention comprises mixing mica flakes and glass flakes in the resin compound for extrusion. The proportion from a cost standpoint is most desirably between one and four parts of mica flakes to one part of glass flakes, although it should be recognized that glass flakes are considered the superior ingredient. The dimensions of the major portion of the mica flakes should fairly match those of the glass flakes although an appreciable quantity of micromica improves the flow of the batch.

The mica flakes should be treated with a coupling agent for promoting their integration in the resin composite panels. The silane and chrome coupling materials suitable for finishing glass flakes serve equally well when applied to the mica flakes. The binding or coupling agent may be added to the resin-flake batch instead of being applied earlier, directly to the flakes.

It has been found that commercially available mica flakes, even though considered moisture free, still carry a fraction percent of moisture that affects the integration of the flakes in a resin composite panel. The properties of such mica reinforced panels have been sufficiently satisfactory and of high enough value that there has been no suggestion that still drier flakes could contribute to improved properties. However, as a part of this invention it has been discovered that removal of the final residue of free moisture carried by the mica flakes increases remarkably the compatibility and attachment of the mica flakes to the binding resin and therefore raises considerably the flexural strength and modulus of such panels.

The recommended method of effecting the extra drying of the flakes is to submit them to a temperature of 350° F. for three hours and to keep them in air tight containers thereafter pending their use.

The resin, glass and mica flake batch may be mixed and extruded with the equipment illustrated in FIGURE 3 and in the same procedure as previously described. The two types of flakes are quite thoroughly oriented by the extruding operation in parallel strata with every second to fifth flake being of glass composition. This placement of the glass flakes successively interrupts each planar series of mica flakes and interposes repeated barriers against cleavage tendencies across such a series.

As previously noted cleavage is more apt to occur at the interface of the copper foil and the base panel. This may be guarded against by employing a flake-resin composite having a thermal expansion coefficient approximately conforming to that of the copper foil. The expansion coefficient varies with the flake content and is controlled therethrough. Also of pertinence is the fact that the flat structure of the flakes largely restricts expansion of the resin content to the thickness dimension of the panel instead of planarly thereof. It is, of course, the planar coefficient of expansion which should match that of the copper foil.

Further protection against cleavage at the interface may be secured through the creation of a layer containing glass as the lone flake constituent in adjoining relation to the copper foil. The balance of the panel may then include either mica flakes or a mixture of glass and mica flakes.

The resin and glass flake surface lamina may be deposited on the copper foil in a thickness of two to five mils as the adhesive coating applied by the roller 49 of FIGURE 3. Alternately, the partition 31 may be inserted in the hopper 30 and the resin-flake glass batch introduced on one side thereof and the batch material containing mica flakes on the other.

Figure 6:
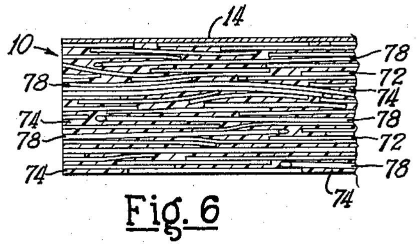
FIGURE 6 is a like section of a third panel embodying different concepts of the invention.
Figure 7:
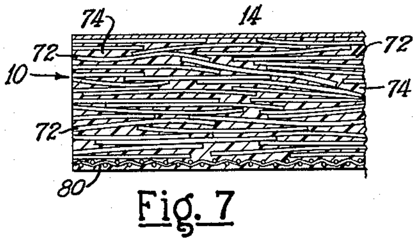
FIGURE 7 shows a vertical section of a portion of another panel depicting a further modification.

Another modified panel coming within the province of the invention is a flake-resin composite panel with glass fibers as a secondary reinforcing element. Such fibers may be in the form of short strands as indicated at 78 in the panel 10*b* of FIGURE 6, or random fibers in very short lengths and with a diameter of no more than five microns. The latter then serve to strengthen the resin films or laminae between the flakes in the same manner as the half micron particles of aluminum oxide in the panel 10*a* of FIGURE 5. The strands 78 of the panel of FIGURE 6 contribute to a strong panel by increasing impact, tensile and compressive strengths above those obtained by flakes alone. This overall strengthening effect is attained to a still greater degree by the utilization of a glass fabric 80 laminate as depicted in the panel 10*c* of FIGURE 7. This fabric may be run through the extruding equipment in conjunction with the strip of "Pataper" release paper 39.

In a similar manner a second glass fabric may be fed through the extruder upon the copper foil. These fabrics may be either woven or unwoven in nature. They, like the glass strands 78 of the panel 10*b* of FIGURE 6, displace flakes and act somewhat independently in their reinforcing capacity. They also have the beneficial effect of drawing resin from the resin-flake mixture and thereby raising the flake content proportionately. However, in the region of a copper facing sheet, glass fabric may lower the resistance to cleavage.

The methods of creating the composite panels is heretofore described are those considered most satisfactory for practicing the invention. Another procedure which may be followed involves the creation of thin papers of glass flakes and combinations of glass and mica flakes. These are deposited from a water slurry and depend upon surface hydroxyl gelation for binding the flakes together. After thorough drying, the sheets are impregnated with resin, stacked and compressed to form a multiply composite panel. In following a previously described concept of the invention, papers of flake glass may be placed above papers of mica flakes at the top of the stacks to be formed into panels for non-cleaving attachment to the copper circuit foil applied thereon.

A particular epoxy resin formulation has been given herein as an example of an effective composition. Various other epoxy resins, as well as polyesters, silicones, straight hydrocarbons such as "Buton" made by the Standard Oil Company of New Jersey, and acrylics (either thermoplastic or cross-linked) are among alternate resins suitable for producing panels of this invention. The thermoplastic acrylics provide post formable panels which may be shaped after assembly to fit into an irregular operating position.

There is accordingly a wide range of resins available. This is also true of curing agents. However, for epoxy resins amine curing systems are preferred, although polyamide and anhydride curing materials give generally acceptable results.

In the selection of the glass flake component it is advisable to avoid too great a proportion of extra fine particles. Should possible difficulties from the size standpoint be anticipated it is recommended that the flakes be screened. The planar sizes of the flakes may thus be established in suitable dimensions, for example, between one-sixteenth and one-quarter inch in diameter, with the flakes being roughly circular in contour. It has been found that large flakes with dimensions above the examplar range are generally broken down in the mixing and extruding operations to sizes having the preferred dimensions.

While flakes two microns in thickness have been specified herein, quite comparable results may be obtained with flakes between two and five microns in thickness. While tensile strength rises with diminishing thickness, a thickness of three and sixth-tenths microns is judged to provide best all around properties. Thicknesses above eight microns cause an appreciable lowering of the values of the desired properties.

An electrolytic film of copper is recommended for the practice of this invention due to the granular surface derived from the electroplating process. This rough surface is very adaptable for adhesive attachment. Should rolled copper foil be utilized a like receptive surface may be created thereon by well known oxidizing processes forming a surface coating of black cupric oxide.

For less costly printed circuit panels aluminum film may be substituted for the copper foil in executing the disclosed process. Silver or gold foil may also be utilized for special purposes, and tantalum or titanium for resistant circuits. When it is desired to employ prestamped circuit patterns these may be attached to carrying sheets and fed through the extruding equipment in place of the copper foil.

For higher production the copper and resin-flake laminate may be left in continuous form and delivered through a curing oven. In one such arrangement opposed flexible, metal belts hold the laminate to shape while conveying it through the curing zone. Fast acting catalysts are used to promote rapid curing and the conveyor belts may run in reciprocating courses to prolong the heat application within the oven.

The circuit printing may be handled expeditiously and more accurately when the base stock is in continuous, flexible form. The acid-resistant material defining the circuit pattern may then be applied by a printing roll and the strip fed continuously through an acid bath, for the removal by etching of the unwanted balance of the copper foil cladding.

The flexibility of the panel stock permits the strip to be turned down beneath a roller for temporary submerging in the acid tank and to be likewise passed under another roller for rinsing in an adjacent washing tank.

The etching treatment can thus be exactly timed. In the usual, manually controlled, etching process prompt removal of the panel from the acid bath may not occur. This delay may cause serious injury to the circuit pattern, as the acid, if given enough time, will act laterally to dissolve the copper from under the surface-protecting layer of resistant material.

As may be concluded from the preceding disclosure ample methods and means have been provided for attaining the objects of the invent ion.

The metal foil is economically joined with the base panel composite by being extruded therewith and permanently attached thereto in a single curing step. This is in contrast to the prior practice wherein the base panel is first shaped and cured and the metal circuit foil is adhered thereto in a separate operation. In the subject method, if the resin component of the panel has good adhesive properties the copper foil is attached thereto in the curing step with no requirement for an extra special adhesive.

The premixing of the resin and flakes and the heated roller type extrusion enables a heavy content of flakes to be utilized and orients the flake in closely arrayed parallel strata. The high glass ratio and accurate alignment are responsible for the excellent properties attained.

Because of its high flexural strength and flexural modulus the panel may be thinner than previous panels and still equal or superior thereto in these structural properties. The flexibility of the panel permits it to be rolled into tube form with the electrical elements interiorly confined. The resulting tubular unit fits neatly, as a subassembly, on a large chassis.

The panels are supplementally fortified or strengthened by the inclusion of a slight quantity of microscopic particles acting to reinforce the resin layers between the glass flakes, while not being sufficiently large or present in great enough quantity to disrupt the highly desirable planar alignment of the glass flakes.

The peel strength of the product which is measured by the force required to strip the copper foil therefrom is above that of conventional panels, being between ten and twelve pounds under the test conditions of military specifications MIL–P–13949B.

As has been set forth, the invention provides means for utilizing the best qualities of mica flakes while curbing the effect of the delaminating propensities of such flakes. This is accomplished by interposing non-cleavable glass flakes between the mica flakes and by concentrating glass flakes adjacent interfaces where splitting or peeling is more apt to occur.

Another valuable attribute of the mica flakes is evidently derived from their water of crystallization. It has been discovered that a panel including mica flakes, of sub-micron thickness, in a proportion by weight as low as one part only to seven parts of glass flakes, is self-extinguishing when submitted to a standard flammability test. The water of hydration appears to be released in the form of steam which acts as an effective flame suppressant.

Other features of the invention involve the combination of flakes with glass fibers in short strands and fabric for bolstering the impact and compressive strengths of the panel.

Another contribution of the invention is the compressible frame facilitating the curing under pressure of the panel blanks.

From the foregoing detailed description and final summary of the invention, it will be understood that further modifications and variations may be effected in the materials, products, and methods without departing from the scope and novel concepts of the invention.

We claim:

1. A dielectric panel including a main planar face, mineral flakes between two and five microns in thickness and in a proportion by weight between fifty-five and eighty-five percent, said mineral flakes being oriented in planes substantially parallel with said main planar face, a resin component interposed between planes of the mineral flakes, and a supplemental resin reinforcing material in particulate form of less thickness than the mineral flakes dispersed through and acting as a reinforcement of the resin component, said supplemental material constituting only one to three percent by weight of said panel.

2. A dielectric panel according to claim 1 in which the supplemental material is in the form of flakelets less than one micron in thickness.

3. A dielectric panel according to claim 1 in which the supplemental material is an aluminum compound.

4. A dielectric panel according to claim 1 in which the supplemental material is in the form of short glass fibers.

5. A dielectric panel including a main planar face, mineral flakes in a proportion by weight between fifty-five and eighty-five percent, said mineral flakes being oriented in planes substantially parallel with said main planar face, and a resin component interposed between planes of the mineral flakes, said mineral flakes including both glass and mica flakes, said glass and mica flakes being of generally comparable dimensions with a thickness between two and five microns.

6. A dielectric panel according to claim 5 in which the ratio of the glass flakes to mica flakes is between one to one, and one to four.

7. A dielectric panel according to claim 5 in which glass flakes are more heavily concentrated in adjoining relation to said main planar face of the panel.

8. A dielectric panel according to claim 5 in which there is a supplemental reinforcing material in particulate form with a general thickness of less than one micron, said supplemental reinforcing material being dispersed uniformly throughout the resin component.

References Cited by the Examiner

UNITED STATES PATENTS

| | | | |
|---|---|---|---|
| 2,619,443 | 11/1952 | Robinson | 156—295 X |
| 2,697,058 | 12/1954 | Lasak | 154—43 |
| 2,704,105 | 3/1955 | Robinson et al. | 161—163 |
| 2,713,699 | 7/1955 | Pooley | 264—54 |
| 2,734,785 | 2/1956 | Toulmin. | |
| 2,763,315 | 9/1956 | Berberich et al. | 161—163 |
| 2,778,762 | 1/1957 | Eisler. | |
| 2,862,244 | 12/1958 | Robb | 18—55 |
| 2,901,455 | 8/1959 | Jurras | 161—58 |
| 2,993,806 | 7/1961 | Fisher et al. | 154—43 |
| 3,000,775 | 9/1961 | Shaw et al. | 154—43 |
| 3,001,571 | 9/1961 | Hatch | 161—168 X |
| 3,003,194 | 10/1961 | Hunkeler | 18—55 |
| 3,013,915 | 12/1961 | Morgan | 154—43 |
| 3,047,442 | 7/1962 | Bozzacco | 161—191 X |
| 3,101,845 | 8/1963 | Heasley | 161—163 X |

ALEXANDER WYMAN, *Primary Examiner.*

R. I. SMITH, W. A. POWELL, *Assistant Examiners.*